Figure 1:
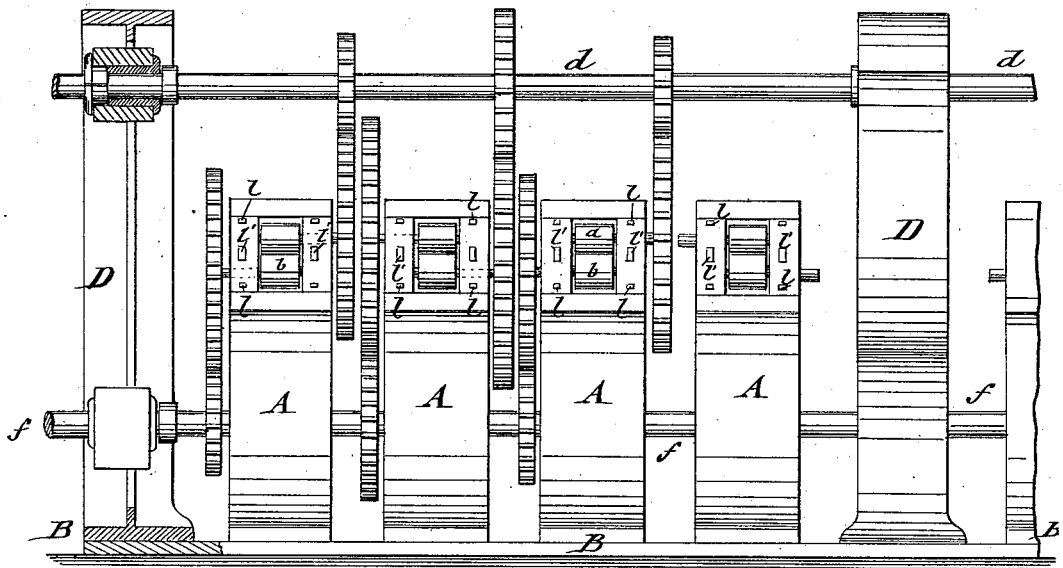

(No Model.) 2 Sheets—Sheet 1.

J. SCHMIDT.
Wire Rolling Machine.

No. 240,190. Patented April 12, 1881.

WITNESSES:
Carl Harz
Otto Risch

INVENTOR
Julius Schmidt
BY Paul Goepel.
ATTORNEY

N. PETERS, PHOTO-LITHOGRAPHER, WASHINGTON, D. C.

(No Model.) 2 Sheets—Sheet 2.

J. SCHMIDT.
Wire Rolling Machine.

No. 240,190. Patented April 12, 1881.

WITNESSES:
Carl Karp
Otto Risch

INVENTOR
Julius Schmidt
BY Paul Goepel
ATTORNEY

UNITED STATES PATENT OFFICE.

JULIUS SCHMIDT, OF SCHWELM, PRUSSIA, GERMANY.

WIRE-ROLLING MACHINE.

SPECIFICATION forming part of Letters Patent No. 240,190, dated April 12, 1881.

Application filed September 25, 1880. (No model.)

*To all whom it may concern:*

Be it known that I, JULIUS SCHMIDT, residing at the city of Schwelm, in the Kingdom of Prussia, German Empire, have invented Improvements in Wire-Rolling Machines, of which the following is a specification.

The invention relates to improvements in wire-rolling machines by which iron rods are rolled in cold state without previous heating, and in such a manner that the size of the rods is gradually reduced in thickness by a series of small rolls, to each of which direct motion is imparted by proper mechanism; and the invention consists of a wire-rolling machine in which a series of frames having each an independent set of drawing-rolls is arranged, each roll obtaining motion by suitable transmission from an upper or lower driving-shaft, and being capable of lateral adjustment in the bearings of the supporting-frames. The drawing-rolls of one frame are revolved in opposite directions to those of the adjoining frame, and so on alternately, and are provided with hexagonal or other grooves, which impart to the wire a uniform hexagonal or other cross-section throughout its entire length.

Figure 2:
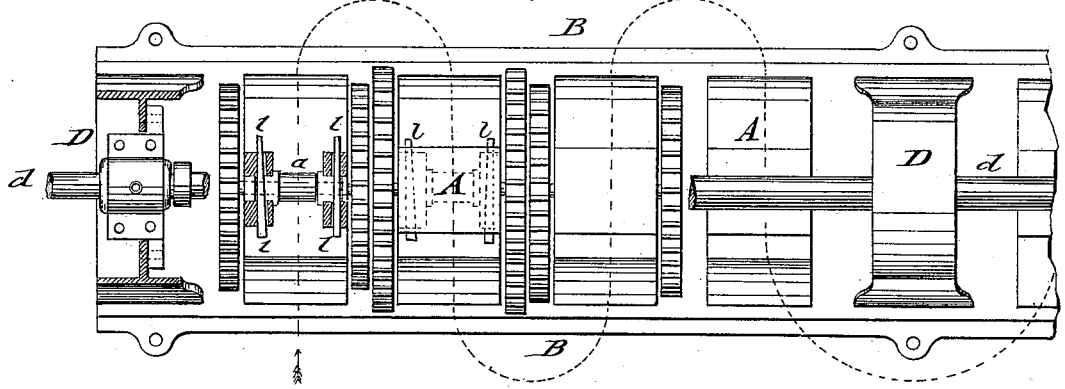
Figure 3:
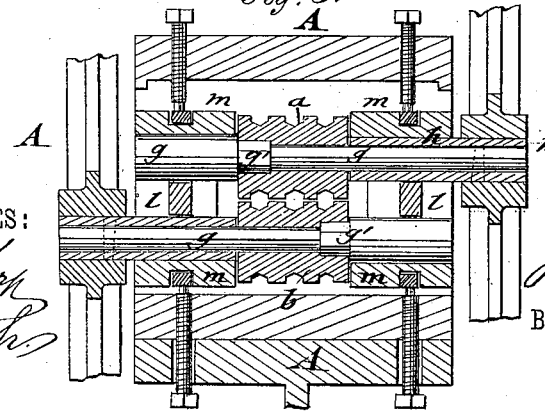
Figure 4:
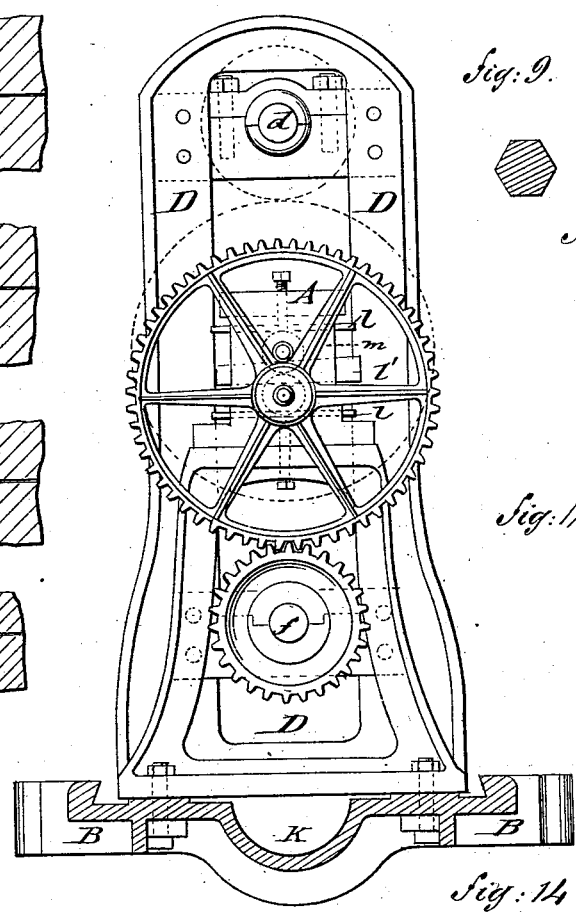
Figure 9:
Figure 10:
Figure 11:
Figure 12:

In the accompanying drawings, Figure 1 represents a side elevation of my improved wire-rolling machine. Fig. 2 is a top view of the same, partly in section. Fig. 3 is a vertical longitudinal section of one set of drawing-rolls on an enlarged scale. Fig. 4 is an end view of the wire-rolling machine with the base-plate in section. Figs. 5, 6, 7, and 8 are detail vertical transverse sections of the successive drawing-rolls with gradually-diminishing hexagonal grooves. Figs. 9, 10, and 11 show different cross-sections of the wire to be rolled; and Figs. 12, 13, 14, and 15 show different dispositions of rolls for imparting to the wire cross-sections of irregular or polygonal shapes.

Similar letters of reference indicate corresponding parts.

Referring to the drawings, *a* and *b* represent a set of drawing-rolls, which are supported in bearings of a strong upright frame, A. A series of frames with independent sets of drawing-rolls are arranged in succession, they forming together the rolling-machine. All the supporting-frames A are secured to a common bed-plate, B, which serves also as the bed-plate for the upright standards D, that carry the bearings of the transmitting-shafts *d* and *f*. The shaft *d* is arranged above and the shaft *f* below the sets of rolls, the latter being placed equidistantly between the same. The transmitting-shafts *d* and *f* receive power from a counter-shaft overhead, and serve to impart rotary motion to the drawing-rolls *a* and *b* by means of transmitting gearing or belting, as desired. In the first set of rolls the upper transmitting-shaft, *d*, imparts motion to the upper roll, *a*, and the lower shaft, *f*, to the lower roll, *b*, while in the next set of drawing-rolls this arrangement is reversed, the upper shaft driving the lower and the lower shaft the upper roll, and so on alternately throughout the entire rolling-machine. One set of drawing-rolls receives thereby a different direction of rotation from its next adjoining set, so that the wire may be passed successively through all the drawing-rolls, as indicated in dotted lines in Fig. 2. The transmitting-shafts *d* and *f*, as well as the transmitting-gear of the different sets of drawing-rolls, are so arranged that the number of revolutions of the roller-shafts, as well as the peripheral velocities of the upper and lower rolls of each set, are nearly uniform, as otherwise, if this were not the case, the quicker-revolving roll would exert a polishing action upon the wire, by which the same would be injuriously affected, and at the same time a loss of power produced. The gears of the several sets of rolls may be so arranged as to cause the rolls of each successive set to rotate at increased rates of speed, whereby the increased length of wire resulting from the decreased section of the materials may be taken up.

The drawing-rolls *a* and *b* are made of small cylinders of steel, cast-steel, or other suitable material, and are provided with a number of circumferential grooves of equal size. These rolls are placed upon short shafts *g*, which are made at one end, as far as the same are in their journal-bearings *m*, of greater thickness, so as to give the necessary support to the roll, while upon the other end a sleeve, *h*, is placed, which is secured by a transverse key.

The shafts *g* are provided adjoining their thicker end with a square or hexagonal collar, *g'*, which fits into corresponding recesses or sockets of the rolls, so that thereby the rolls are compelled to follow the motions of the shafts $g$. The enlarged ends and collars are, however, not arranged in both shafts $g\ g$ on the same side, but at opposite sides, as shown clearly in Fig. 3. By this construction and connection of the rolls and shafts the rolls may be readily removed from the shafts when worn out and new ones supplied, the same shafts serving for different sets of rolls. By means of the transverse wedges $l$ the bearings $m$, and thereby the rolls $a\ b$, may be laterally adjusted in such a manner that the grooves of the upper and lower rolls match each other in an accurate manner. By means of the wedges $l'$ the rolls may be adjusted vertically.

In the process of drawing wire the grooves at the right-hand end of the rolls are first used until the same are entirely worn out, after which the next grooves, and so on, are used, until all are entirely worked out. As each roll receives its motion from a separate transmitting-shaft independently of the other, small drawing-rolls can be employed, which is a great advantage over the wire-drawing machines heretofore in use, in which the upper roll either carried the lower one along, or vice versa. This is avoided by the use of separate transmitting-shafts, and thereby a more positive and reliable action of both drawing-rolls upon the wire obtained. It is most advantageous to employ round rods for rolling.

Figure 5:
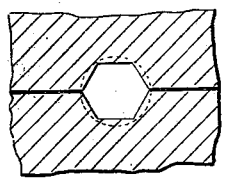
Figure 6:
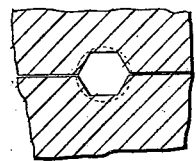
Figure 7:
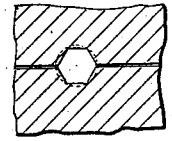
Figure 8:
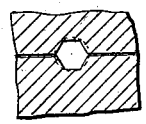

The size of the grooves at the first set of rolls is obtained by constructing a hexagon within a circle the diameter of which is equal to that of the iron rod to be drawn, and making the groove of each roll equal to one-half of this hexagon, as shown in Fig. 5. The height of this hexagon furnishes the diameter of the circle within which the hexagon for the grooves of the second set of rolls is constructed, and so on, as indicated clearly in Figs. 5, 6, 7, and 8. Grooves of hexagonal shape have the advantage that any change in the structure of the fibers is entirely obviated. If this, however, should not be of great importance the grooves may be made of somewhat flatter hexagonal shape, so that a greater degree of drawing takes place. To prevent, however, the two great pointing or beveling at the sides of the wire, by which structural changes might take place in the metal, the grooves are preferably made of somewhat greater width, so that they are not entirely filled by the wire in a lateral direction, and that thereby a wire with short rounded-off side corners is obtained, as shown in Fig. 10. If the wire were rolled to such an extent as to fill up entirely the space within the grooves, there would be danger of side seams, especially when either one of the rolls was not set with sufficient accuracy, which, however, is fully avoided by giving the grooves greater lateral width than height.

For rolling wire of round cross-section the grooves are made semicircular instead of angular, by which the round shape is gradually rolled out. Flat and angular wires may be produced by passing the wire through the set of rolls shown in Fig. 12. By these rolls the thickness can be considerably reduced, as the stock cannot be forced sidewise.

Figure 13:
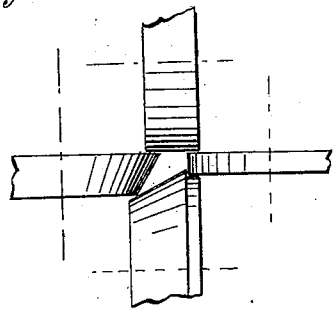
Figure 14:
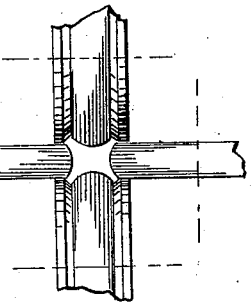
Figure 15:
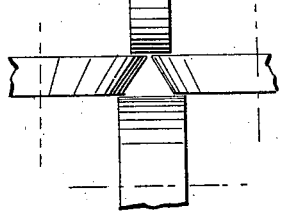

For producing wires of polygonal, irregular, or concave cross-section, the sets of rolls shown in Figs. 13, 14, and 15 are employed, in which the rolls having horizontal axes are operated, as before described, by the upper and lower transmitting-shafts, while the intermediate rolls, having vertical axes, are carried along by the friction of the overlapping vertical rolls therewith. It is obvious that the grooves of these rolls should correspond to the cross-section of the wire to be rolled. For cooling the rolls water is employed, which is conducted off through a gutter, K, of the bed-plate, as shown in Fig. 4.

Instead of arranging the set of rolls in line and sidewise to each other, they may be put up in line one in front of the other, by which the bending of the wire in passing from one set of rolls to the next adjoining one, as in Fig. 2, may be dispensed with.

An essential advantage of this method of drawing out wire consists in rolling the wire in cold state, and in the employment of smaller rolls than heretofore, by which the iron rods employed receive a uniform pressure toward the center without structural changes and without any formation of surface seams.

Having thus described my invention, I claim as new and desire to secure by Letters Patent—

1. In a wire-rolling machine, the combination of a set of small drawing-rolls with intermediate gearing and with an upper and lower transmitting shaft respectively, by which each drawing-roll receives direct and independent motion, substantially as and for the purpose set forth.

2. In a wire-rolling machine, the combination of a series of sets of drawing-rolls with an upper and lower transmitting-shaft and with a separate gearing for each roll, the gearing being arranged in such a manner that each roll receives direct and independent motion, and that adjoining sets of rolls are revolved in opposite directions to each other, all substantially as and for the purpose described.

3. In a wire-rolling machine, the combination of drawing-rolls having shafts $g$, each of which has an enlarged portion and angular collar $g'$ at one end and sleeve $h$ at the opposite end, with journal-bearings $m$ and transverse adjusting wedge-keys $l$, substantially as specified.

In testimony whereof I have signed my name to this specification in the presence of two subscribing witnesses.

JULIUS SCHMIDT.

Witnesses:
E. BARTENWERF,
N. GÜLICH.